May 5, 1953 L. H. CONNELL 2,637,561

METHOD AND MEANS OF MAGNETIC RECORDING AND REPRODUCING SOUND

Filed Feb. 8, 1947 2 SHEETS—SHEET 1

INVENTOR.
LAWRENCE H. CONNELL
BY Parker & Burton
ATTORNEYS

May 5, 1953

L. H. CONNELL

METHOD AND MEANS OF MAGNETIC RECORDING AND REPRODUCING SOUND 2,637,561

Filed Feb. 8, 1947

2 SHEETS—SHEET 2

INVENTOR.
LAWRENCE H. CONNELL

BY

Parker & Burton

ATTORNEYS

Patented May 5, 1953 2,637,561

UNITED STATES PATENT OFFICE 2,637,561

METHOD AND MEANS OF MAGNETIC RECORDING AND REPRODUCING SOUND

Lawrence H. Connell, Detroit, Mich.

Application February 8, 1947, Serial No. 727,424

1 Claim. (Cl. 274—11)

Figures 1, 4:
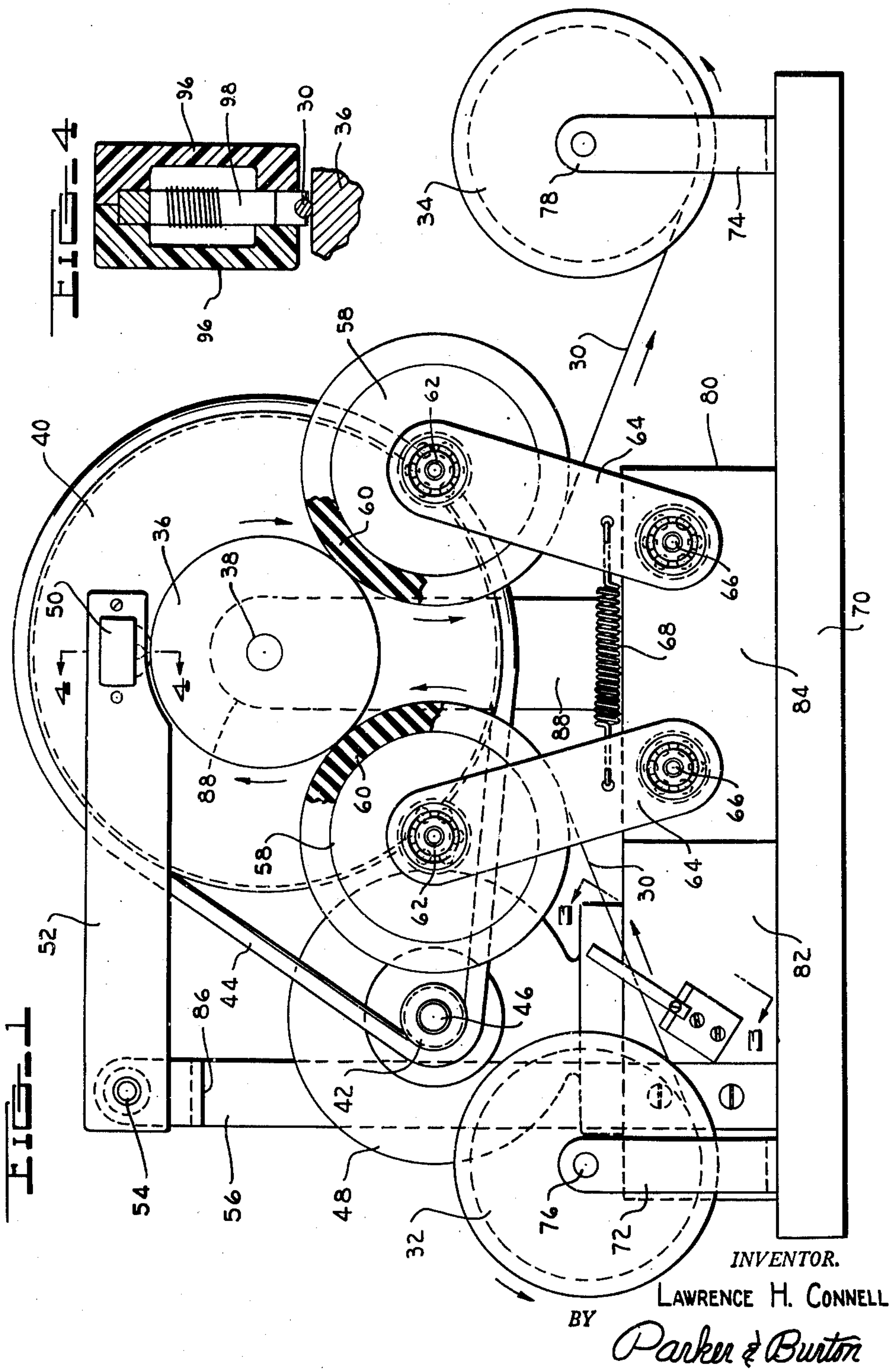

This invention relates to sound recording and reproducing systems and particularly to a method of and means for magnetically recording and reproducing sound.

Heretofore, in devices for magnetically recording and reproducing sound upon elongated recording members, such as wire or tape, the recording member has been passed in unsupported relatively free condition by the magnetic sensitive head which is either operative to impress magnetic variations in the member or to pick up such magnetic variations for the reproduction thereof into distinguishable sounds. The sensitive magnetic head has heretofore operated in magnetic relation to a free section of the recording member moving between an unwinding device or reel and a winding device or reel. Although satisfactory magnetic recordings and reproductions have been made by such devices, there has been present objectionable noises and discords in the reproduction of the sound carried on the magnetized recording member. These undesirable noises have made wire recording and reproducing systems of this character compare relatively unfavorably in tone quality with disc recording and reproducing systems.

I have discovered that a source of such objectionable noises and discords is the recurrent and/or variable frequency of some non-uniform part or parts of the apparatus falling within the discordant range and that particularly one source of such noise is due to the elasticity of the recording medium causing minute elongation and contraction thereof as it passes in magnetic relation to the head. I have found that if the elongation and contraction of that portion of the recording member immediately before and immediately after the head is substantially dampened out, most if not all the discordant noises heretofore prevalent in such apparatus is for all practical purposes substantially eliminated from the reproduced sound and the tone quality is considerably improved.

An important object of this invention is to provide a novel method of and means for magneticaly recording on a recording member and for magnetically reproducing sound waves from a recording member which substantially eliminates all objectionable noises and discords heretofore occurring in such systems. Another important object of the invention is to provide a novel mechanism for advancing the recording member through a magnetically recording or a magnetically reproducing head which dampens or substantially prevents any axial elongation or contraction of that portion of the recording member passing through the head. A further important object of the invention is to provide apparatus for accomplishing this purpose which is inexpensive to manufacture and assemble and which can be incorporated on existing devices of this character without appreciable alteration in design.

Figure 2:
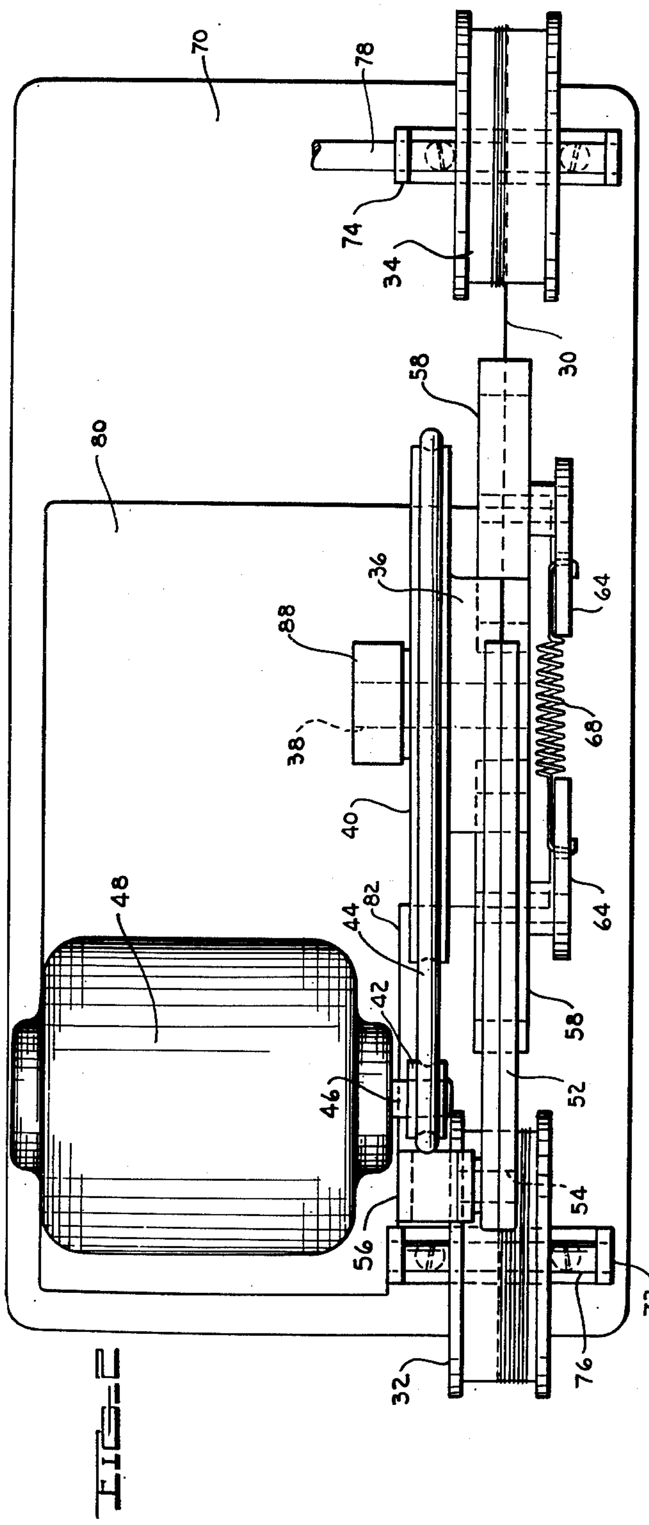
Figure 1:
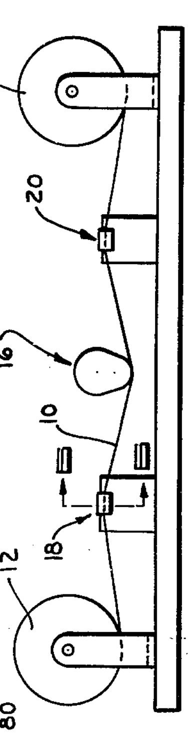
Figure 3:
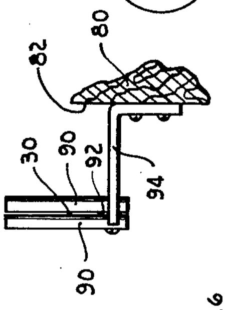
Figure 4:
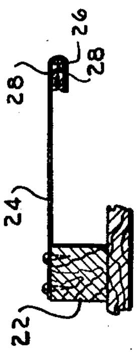

Various other objects, advantages and meritorious features of the invention will become more fully apparent from the following specification, appended claim and accompanying drawings wherein:

Fig. 1 is a side elevation of an apparatus embodying the features of the invention, Fig. 2 is a top plan view of the apparatus of Fig. 1, Fig. 3 is a detail sectional view along line 3—3 of Fig. 1, Fig. 4 is an enlarged detail vertical sectional view along line 4—4 of Fig. 1, Fig. 5 is a modification of the invention schematically illustrating another manner of accomplishing the objects of the invention, and Fig. 6 is an enlarged detail sectional view along line 6—6 of Fig. 5.

Discord is a phenomenon of beats, and it is well understood by those skilled in the art that approximately 30 beats per second produce the worst or most undesirable discord, and that fewer than five and more than 60 beats per second are usually outside of the discord producing range. In discovering the reason for the production of the discordant noises in magnetically operated sound recording and reproducing systems, I have found that the elasticity of the recording medium, such as a steel wire, produces a periodic or an aperiodic stretching and contraction of that portion of the recording medium passing through the magnetic sensitive head which, if sufficiently dampened out or prevented eliminates the production of discordant and undesirable noises heretofore encountered in these types of apparatus. This stretching and contraction, although minute, nevertheless mainly operates at a frequency which itself is within the discordant range or which heterodynes against the musical frequency to produce a frequency in this range and heretofore superimposed its undesired tones either upon the recording medium when the sound waves were magnetically recorded thereon or in the reproduction of sound waves by a magnetically responsive reproducing head. The elastical stretching and contraction of the recording member apparently results either from some non-uniformity of the speed of the driving and guiding members of the apparatus or non-uniformity of friction between the guiding members and the recording medium.

It is the common practice as hereinabove mentioned to run the wire from a reel onto a constant speed reel or around a constant speed capstan. The magnetic device or sound head which either impresses magnetic variations on the wire or is influenced by the magnetic variations therein has been located in the past between the take-off reel and the winding reel if a capstan is omitted. A change in tension in the wire, which may be caused by non-uniformity in the speed or friction of one or more parts of the apparatus or by the vibration of the wire itself, will produce a change in length of the wire. The extent of the change in length of the wire will depend upon a number of factors such as the degree of change in tension, the effective length of the wire, the modulus of elasticity of the wire, and the cross-sectional area of the wire. Since the wire is not rigidly held but passes on and off various members of the apparatus in its travel, the limits of its effective length are not readily ascertainable. However, for illustrative purposes, the effective length can be considered as the distance between the point of contact with the head and either the point of contact with the constant speed capstan or constant speed reel which ever is employed.

The change in length of a wire member can be represented by the formula:

$$\Delta D = \frac{\Delta PL}{AE}$$

where $\Delta D$ is the change in length, A is the cross-sectional area, L is the effective length, E is the modulus of elasticity of the material of the wire, and P the axial load on the wire. In an inch-pound ratio, A may be measured in square inches, L in linear inches, E in pounds per square inch and P in pounds. If P and L can be lowered it is evident that the change in length of the wire can be reduced. A and E are relatively constant factors concerning the material of the wire and assuming a standard type of recording wire is employed cannot normally be altered. The change in P can be reduced by introducing low inertia constant tension devices and by lubrication between the wire and the sound head. L can be reduced by more compact assembly of parts. All this assumes that the moving parts are operated at constant speed and in synchronism. Any non-uniformity in the velocity controlling and guiding parts of the apparatus will impose a tension on the wire which will produce a vibratory elongation and contraction of the wire and cause a discordant noise to be reproduced.

Various experimental arrangements have produced beneficial results. I have found that moving the sound head closer to the capstan or toward either one of the reels reduces the discordant noises. Better results were obtained by the provision of one or more low inertia constant tension devices through which the recording medium was fed.

An example of an apparatus employing such low inertia means is schematically illustrated in Figs. 5 and 6. The recording medium which in this instance is the steel plated wire 10 is unwound from one reel 12 and simultaneously wound upon a second reel 14 spaced therefrom. Approximately mid-way between the two reels the wire passed through the magnetic field of a magnetically sensitive head generally indicated at 16 which may either serve to impress magnetic variations on the wire or pick up such variations and control the reproduction of sound waves in the apparatus.

Without the provision of any means for preventing the elongation and contraction of the wire, the usual discordant and objectionable noises were reproduced. To dampen and thereby substantially prevent such elongation and contraction of the recording wire, I provided on opposite sides of the sound head and between the the same and the reels means in the form of low inertia spring devices which considerably helped to reduce changes in tension of the wire portion passing in the vicinity of and through the sound head. One such device indicated at 18 is positioned between the take-off reel 12 and the head, and the other device indicated at 20 is positioned between the head and the take-on reel 14.

It is preferred to construct each device 18 and 20 so that it will act with the lowest possible inertia on the wire to substantially eliminate any change in the tension of the wire. To satisfactorily accomplish this purpose, the device will move with the wire rather than let the tension of the wire change. Shown in Fig. 6 is one example of a low inertia device for this object. It comprises a base 22 of wood or the like disposed off to one side of the wire. Secured to the tip of the base is one end of a thin flexible member 24 preferably formed of metal which projects laterally therefrom. The free end of the member is bent upon itself into the form of a U to provide an end section 26 thereof extending parallel to the major length of the member. Interposed between the bent section 26 and the opposite portion of the member is a mass of cushioning material such as felt. Preferably, two similar pads of felt indicated at 28—28 are used which are lightly compressed together on opposite sides of the recording wire 10.

As shown in Fig. 5, the padded free end of the member 24 of each device is disposed offset to the plane common to the operating end of the sound head and the peripheral portion of either reel from or upon which the wire is led. This causes the wire to detour slightly out of the plane between each reel and the sound head as is evident in Fig. 5. Each device 18 or 20 may be disposed slightly above the plane as shown in Fig. 5 or slightly therebelow.

In operation, the recording wire runs smoothly through the felt pads of each device. Any vibratory motions set up in the wire as it leaves the reel 12 or feeds on the reel 14 is substantially damped out by the devices so that the section of wire between the two devices travels without any vibration. If any non-uniformity of speed or friction in the moving parts of the apparatus occur, a tension will be imposed on the recording wire tending to stretch or extend its length. In such an event either one or both the flexible members 24 of the two dampening devices 18 and 20 will yield or flex to the force, such as by bending toward the straight line position of the wire between each reel and the sound head. When the tension is eased the members 24 will return to their initial operation position. In this manner any change in tension which would otherwise stretch the section of the wire in the vicinity of the sound head will be substantially eliminated or at least confined to the sections of the wire remote from the head.

The preferred apparatus for accomplishing the objects of the invention is illustrated in Figs. 1 to 4 inclusive. The recording member or wire in this instance is supported along that section of the length adjacent to the magnetic sensitive head. The support provides a moving surface in engagement with the recording member and moves along therewith at the same rate of speed. Referring to Figs. 1 to 4, the recording member or wire is indicated at 30 and is taken off the reel 32 and wound on the reel 34. Intermediate the reels is a cylindrical member or capstan 36 fixed on a shaft 38 to which a driven sheave wheel 40 is secured. In the illustrated embodiment of the invention the latter is approximately twice the diameter of the capstan, but it is understood the dimensions of the two members may be varied to suit different conditions. The sheave wheel 40 is operatively coupled to a drive pulley or sheave wheel 42 by means of the endless belt 44. The driving sheave wheel 42 is fixed to a drive shaft 46 of a source of power such as the electric motor 48.

A magnetic sensitive sound head of any suitable conventional type is indicated at 50 superimposing the capstan and resting lightly on the recording member which in turn rests on the peripheral surface of the capstan. The head is carried on one end of a lateral extending arm 52, which has its opposite end pivoted at 54 to an upright post 56. Yieldingly bearing against the opposite sides of the capstan are two idling wheels 58—58 of similar construction which are free to rotate. Preferably these wheels engage the capstan below the axis of rotation thereof as shown in Fig. 1 and in such a relation to the capstan that a line extending from the capstan's axis to either axis of rotation of the idling wheels subtends an angle of approximately 45° to the vertical. The wire 30 is led under each idling wheel 58—58 and over the capstan and follows a path of movement indicated by the arrows in Fig. 1.

To preclude the possibility of developing eddy currents in the capstan, it is highly desirable to form the capstan out of insulating material such as a plastic compound, glass, et cetera. This is especially true when the device is used during the recording operation. The idling wheels are preferably constructed with a peripheral portion formed of a yieldable plastic or rubber. As shown in Fig. 1 each wheel is provided with a surface portion 60. In addition to being free to rotate, each idling wheel 58—58 is mounted for bodily movement toward and away from the capstan. Each wheel is journaled by bearings or the like about a shaft 62. Each shaft is secured to the upper end of an arm 64 which is swingable toward and away from the capstan. The lower end of each arm is journaled by bearings or the like to a fixed pivot pin 66 located inwardly of the axis of rotation of its respective wheel axis. The arms 64—64 are yieldingly urged toward one another to carry the wheels into engagement with the capstan by any suitable means such as the tensioned coiled spring 68 connected to both arms above their pivotal axes. It is evident that the spring yieldingly urges the resilient surface portions of the idling wheels into yielding contact with the rim of the capstan.

The various parts of the apparatus may be mounted in any suitable way. As shown, the parts are supportingly mounted to form a unitary assembly. The supporting means comprises a relatively wide base 70 adjacent to the opposite ends of which the reels 32 and 34 are mounted by means of corresponding U-shaped brackets 72—74 respectively. Each reel is fixed to a shaft which is rotatably journaled in the upright arms of the bracket. The shaft for the take-off reel is indicated at 76; the shaft for the take-on reel is indicated at 78. The latter may project rearwardly as shown in Fig. 2 and be provided with any suitable conventional means for rotating the shaft from the power source and for reciprocating the shaft and reel 32 back and forth in order to lay the wire evenly around the reel. Superimposing the base is a block 80, the front side of which is divided into two surface sections 82 and 84 in different vertical planes. The motor 48 is mounted on the top of the block. The post 56 may be in the form of a metal strip secured at its lower end to the front section 82 of the block and jogged intermediate its length at 86 to predispose the arm 52 in alignment with the capstan 36. The shaft 38 upon which the capstan and sheave wheel 40 are carried is mounted in an upright supporting member 88, the lower end of which is secured to the top of the block 80. The two shafts 66—66 about which the arms 64—64 pivot are supportingly mounted in the block and project forwardly from the front section 84.

The wire 30 is properly directed under the first idling wheel 58 by means of a guiding device comprising two parallel closely extending cylindrical members or rods 90—90 shown in detail in Fig. 3. The wire 30 as shown in Fig. 3 is led between the two rods and regardless of what peripheral portion of the reel 32 the wire is taken off it is fed to the first idling wheel along a predetermined line. The two rods are spaced apart from one another a distance slightly greater than the diameter of the wire in order to allow it to run freely therebetween. A spacer 92 may be used for this purpose. The two rods are mounted on a bracket 94 which in turn is secured to the front section 82 of the supporting block 80.

Fig. 4 represents an enlarged detail sectional view through the magnetic head 50 showing its relation to the periphery of the capstan 36 and the wire 30 supported thereby. The magnetic head may be any conventional or suitable type and its particular construction has no reference to the present invention. As shown in Fig. 4, the head comprises two complementary wall members 96—96 supporting a horseshoe type of magnet 98 therebetween. The open ends of the magnet are very slightly spaced apart as is the conventional practice and they are grooved tangentially to provide a track for the recording wire to run therethrough as shown in Fig. 4. An important feature of the present invention is the fact that the section of the wire passing by the magnetic head is supported by a moving surface such as the periphery of the capstan which travels at the same speed as the wire. Moreover, for a considerable distance on either side of the head, the wire is in relatively tight engagement with the supporting surface represented by the capstan thereby frictionally holding this portion of the wire against elastical or vibratory movement. In the illustrated embodiment of the invention, the wire is held tightly against a peripheral portion of the capstan amounting to approximately 270° of its circular extent. The head is disposed in magnetic relation to the wire approximately midway between these two limits. Therefore, for that portion of the length of the wire immediately adjacent to the magnetic head, any stretching or contraction of the wire resulting from tension created by any non-uniform stationary or moving part of the apparatus is substantially dampened out before it reaches that portion of the wire in the vicinity of the head. The length of wire in contact with the capstan is determined by the smoothness of operation of the parts preceding and following the capstan. This distance should be sufficient to prevent substantially all variable or fluctuating elongation and contraction of the wire. A drum or capstan of 3¾ inch diameter has been found to be highly desirable for this purpose.

I have found that it is also desirable, if the magnetic heads employed are microphonic, that is, act to transmit mechanical vibrations into electrical impulses, to solidly impregnate the head with an electrical and vibrational insulation material such as asphalt. Lubricant between the wire and the head is helpful but a solidly impregnated body of asphaltum material both inside and outside the magnetic head produces better results.

What I claim is:

In a magnetic recording or play-back apparatus, supply means for supporting a quantity of resilient, longitudinally stretchable, elongated record element, take-up means for receiving the record element from said supply means, a capstan, means for driving the capstan, a first roller intermediate said supply means and said capstan, a second roller intermediate said take-up means and said capstan, said rollers having surface portions formed of yieldable material in pressure contact with circumferentially spaced parts of the surface of said capstan, said record element extending from said supply means to and partly around said first roller, thence around that portion of said capstan intermediate its circumferentially spaced surface parts in contact with said rolls, thence partly around said second roll and thence to said take-up means, a sound head positioned to engage that portion of the record element on the surface of said capstan midway between said rolls, said rolls being operative to absorb the energy of vibrational and other axial expansion and contraction originating in the portions thereof intermediate said supply and take-up means and the rollers adjacent thereto and to isolate the portions of the record element in contact with the surface of said capstan from the portions between said capstan and said supply and take-up means.

LAWRENCE H. CONNELL.

References Cited in the file of this patent

UNITED STATES PATENTS

| Number | Name | Date |
|---|---|---|
| 1,713,726 | Vogt et al. | May 21, 1929 |
| 1,920,789 | Heisler | Aug. 1, 1933 |
| 2,237,738 | Kuhlik | Apr. 8, 1941 |
| 2,238,412 | Daniel | Apr. 15, 1941 |
| 2,251,322 | Buhrendorf | Aug. 5, 1941 |
| 2,349,018 | Tasker | May 16, 1944 |
| 2,418,543 | Camras | Apr. 8, 1947 |
| 2,468,198 | Heller | Apr. 26, 1949 |

FOREIGN PATENTS

| Number | Country | Date |
|---|---|---|
| 4,933 | Australia | Nov. 26, 1926 |
| 606,631 | Germany | Oct. 25, 1934 |